United States Patent Office 3,595,871
Patented July 27, 1971

3,595,871
PREPARING SUBSTITUTED THIAZOLE-SULFENAMIDES
Robert Henry Campbell, St. Albans, and John Joseph D'Amico, Dunbar, W. Va., assignors to Monsanto Company, St. Louis, Mo.
No Drawing. Filed Aug. 19, 1968, Ser. No. 753,785
Int. Cl. C07d 71/48
U.S. Cl. 260—306.6                    11 Claims

ABSTRACT OF THE DISCLOSURE

An N-substituted 2-thiazolesulfenamide is reacted with a primary or secondary amine less volatile than the amine from the sulfenamide reactant and the more volatile amine by-product is removed from the reaction zone to obtain a different N-substituted 2-thiazolesulfenamide.

---

The invention relates to preparing sulfenamides by replacing the amide of an N-substituted 2-thiazolesulfenamide with a different amide.

A common method of making N-substituted 2-thiazolesulfenamides is by oxidative condensation of a mercaptothiazole or disulfide thereof and an amine. Alternatively, Howland's U.S. Pat. No. 2,382,793 of Aug. 14, 1945, describes the method of preparing sulfenamides by reacting an unsubstituted 2-thiazolesulfenamide with a primary or secondary amine which is stronger base than ammonia, ammonia being split off in the process. However, the unsubstituted 2-thiazolesulfenamide must be especially prepared for the reaction and is not readily obtained. Although it is known from Hardman's U.S. Pat. No. 3,133,920, May 19, 1964, that sulfur and morpholine attack the sulfur-nitrogen bond of substituted and unsubstituted thiazolesulfenamides yielding morpholinodithiothiazoles, it was not heretofore known that reactants consisting essentially of an N-substituted thiazolesulfenamide and morpholine could be reacted to obtain a thiazolesulfenamide, i.e., a morpholinothiothiazole.

An improved method of preparing sulfenamides has now been discovered which comprises reacting chemicals consisting essentially of an N-substituted-2-thiazolesulfenamide and an amine having at least one replaceable hydrogen, which amine is less volatile than the amine resulting from the addition of hydrogen to the amide group of the starting sulfenamide, and removing by-product amine. It is possible to obtain substantially complete conversion of the starting sulfenamide. By the process of the present invention, a weaker amine may replace a stronger amine. Desirably, the difference in boiling point is 20° C. or more. Thus, n-butylamine, secbutylamine, isobutylamine, and higher alkyl amines are suitable amine reactants where tert-butylamine is to be removed from the starting sulfenamide. The secondary amines used where tert-butylamine is to be removed preferably contain five or more carbon atoms although use of methyl-n-propylamine, boiling point 63° C., is feasible.

The method is particularly applicable to reaction of substituted 2-thiazolesulfenamides in which the amide substituent is

where R is lower alkyl and R' is lower alkyl or hydrogen with a primary or secondary amine less volatile than By-product

is removed from the reaction zone. Products are readily obtained which contain less than about 10% of the starting sulfenamide. Representative examples of thiazole substituents which may be present in the thiazolesulfenamide reactant are:

2-benzothiazolyl
2-naphthothiazolyl
5-chloro-2-benzothiazolyl
4-methyl-2-benzothiazolyl
6-ethoxy-2-benzothiazolyl
2-thiazolyl
4-methyl-2-thiazolyl
4-ethyl-2-thiazolyl The sulfenamide and amine are preferably reacted neat at the temperature at which the starting N-substituted sulfenamide is molten, but solvent may be present if desired. The amine is generally used in at least stoichiometric proportions, and the use of a slight excess is desirable. Of course, mixture of sulfenamides can be produced by using less than the stoichiometric proportion, the mole percent of amine being selected to give the desired composition. For each molecular proportion of sulfenamide reactant there is generally used from 0.1 to 1.5 molecular proportions of amine. The recovery of excess amine from a non-aqueous system presents no problem, and there is no reason to have water present. For optimum efficiency, about a 10–25% excess of amine is used. By-product amine from the starting sulfenamide as well as any excess of the amine reactant are preferably recovered. Purging the reaction mixture with an inert gas like nitrogen is a wide safety precaution, and the flow of nitrogen throughout the course of the reaction aids in sweeping out and recovering by-product amine. Sparging nitrogen through the molten neat product aids recovery of excess amine reactant. It is convenient to carry out the first part of the reaction at atmospheric pressure and gradually reduce the pressure while continuing the heating. In the absence of solvent, it is desirable to use enough amine reactant to dissolve the sulfenamide or to use high enough temperature to get a stirrable slurry.

Reaction temperatures within the range of 80°–100° C. are about optimum, but temperatures within the range of 75°–120° C. are feasible. The minimum temperature is boiling point of the amine to be replaced at a given pressure, and the maximum temperature is determined by the stability of the sulfenamide product. At temperatures above about 120° C. the formation of by-products may become noticeable. The reaction product of N-tert-butyl-2-benzothiazole and morpholine at 140° C. contains 2-morpholinobenzothiazole. Regardless of the reaction temperature, the quality of the product is influenced by the quality of the sulfenamide reactant, and it is preferred to start with a sulfenamide of 95% assay or better.

N-tert-butyl-2-benzothiazolesulfenamide is the preferred sulfenamide reactant. Said sulfenamide is made in large quantities and is a readily available economical intermediate. It is one of the more stable sulfenamides, and tert-butylamine has a favorable low boiling point which makes recovery relatively easy. The enhanced thermal stability and relative ease of removal of tert-butylamine promote formation of high quality products. In general, the alkyl group of the starting sulfenamide is lower alkyl of 1 to 5 carbon atoms. Suitable examples of

are methylamino, dimethylamino, ethylamino, diethylamino, n-propylamino, isopropylamino, di-n-propylamino, n-butylamino, sec-butylamino, tert-butylamino, isoamylamino, sec-amylamino, and tert-amylamino.

The amine reactant is selected so as to provide an amine less volatile than the by-product amine so that the reaction may be carried to completion by removal of the by-product amine. The amine reactant is conveniently a heterocyclic amine, examples of which are morpholine, 2,6 - dimethylmorpholine, 3,5-dimethylmorpholine, pyrrolidine, 2,5-dimethylpyrrolidine, piperidine, 2-methylpiperidine, 4-methylpiperidine, piperazine, hexamethylenimine, heptamethylenimine, or octamethylenimine. Other suitable amines are ethylenediamine, cyclohexylamine, phenethylamine, benzylamine, propylenediamine, furfurylamine, tetrahydrofurfurylamine, and ethanolamine.

The practice of the invention is illustrated by the following representative examples.

EXAMPLE 1

A stirred solution containing 49 grams (0.2 mole) of 98% N-tert-butyl-2-benzothiazolesulfenamide and 0.25 mole (25% excess) of morpholine is heated at 80°–90° C. for an hour. During this heating period, tert-butylamine is collected. Vacuum (10–20 mm.) is applied and the temperature held at 80°–90° C. for 15 minutes after which the pressure is decreased to 5–10 mm. and the temperature held at 80°–90° C. for another 15 minutes. During the vacuum-heating period, the remainder of the tert-butylamine and excess morpholine are removed. The molten 2-(morpholinothio)benzothiazole is poured into an evaporating dish and allowed to stand overnight. The resulting solid is pulverized. The product is obtained in 100% yield as a solid. After recrystallization from isopropyl alcohol, it melts at 86°–87° C. Analysis gives 11.34% nitrogen and 25.60% sulfur compared to 11.10% nitrogen and 25.41% sulfur calculated for $C_{11}H_{12}N_2OS_2$.

As an alternate procedure for working up the product, an identical reaction is carried out except that after releasing the vacuum, 100 ml. of isopropyl alcohol is added to the molten product and the reaction mixture heated while stirring to 85° C. for solution. The stirred solution is allowed to cool slowly to room temperature, cooled to 0°–10° C. for 30 minutes, filtered, and air-dried at 25°–30° C. The same product is obtained in a yield of 95%, M.P. 85°–86° C.

Other sulfenamides and the yields thereof obtained by reacting N-tert-butyl-2-benzothiazolesulfenamide and the appropriate amine in the procedure of Example 1 are recorded below:

2-(2,6-dimethyl - 4 - morpholinothio)benzothiazole, in 100% yield as a solid. After recrystallization from isopropyl alcohol, it melts at 104°–105° C. Analysis gives 10.12% nitrogen and 22.93% sulfur compared to 9.99% nitrogen and 22.87% sulfur calculated for $C_{13}H_{16}N_2OS_2$.

2-piperidinothiobenzothiazole in 100% yield as an off-white solid. After recrystallization from isopropyl alcohol, it melts at 82°–83° C. Analysis gives 11.31% nitrogen and 25.70% sulfur compared to 11.19% nitrogen and 25.01% sulfur calculated for $C_{12}H_{14}N_2S_2$.

In this experiment 0.125 mole (25% excess) of 1,3-diaminopropane is employed to obtain trimethylenebis(2-benzothiazolesulfenamide) in 100% yield as white solid. After recrystallization from isopropyl alcohol, it melts at 111°–112° C. Analysis gives 13.86% nitrogen and 31.77% sulfur compared to 13.85% nitrogen and 31.70% sulfur calculated for $C_{17}H_{16}N_4S_4$.

2-(pyrrolidinylthio)benzothiazole in 100% yield as a solid. After recrystallization from heptane it melts at 55° C. Analysis gives 11.75% nitrogen and 27.23% sulfur compared to 11.85% nitrogen and 27.13% sulfur calculated for $C_{11}H_{12}N_2S_2$.

2-(2,5 - cis and trans-dimethylpyrrolidin - 1-ylthio) benzothiazole in 100% yield as a white semi-solid. The molten product is cooled at 0°–10° C. for 24 hours and air-dried on a porous plate at 15°–20° C. After recrystallization from heptane, it melts at 37°–37.5° C. Analysis gives 10.41% nitrogen and 24.19% sulfur compared to 10.60% nitrogen and 24.26% sulfur calculated for $C_{13}H_{16}N_2S_2$.

2 - (hexahydroazepin - 1 - ylthio)benzothiazole in 96.5% yield as a light tan solid. The molten product is poured into 700 ml. of water, stirred at 25°–30° C. for 30 minutes, filtered, and air-dried at 25°–30° C. After recrystallization from isopropyl alcohol, it melts at 104°–105° C. Analysis gives 10.56% nitrogen and 24.17% sulfur compared to 10.60% nitrogen and 24.26% sulfur calculated for $C_{13}H_{16}N_2S_2$.

N - cyclohexyl - 2 - benzothiazolesulfenamide in 89.6% yield as a light tan solid. In this example, after vacuum is released, 150 ml. of isopropyl alcohol is added to the molten product and while stirring heated to 85° C. for solution. The stirred solution is allowed to cool slowly to room temperature, cooled to 0°–10° C. for 30 minutes, filtered, and air-dried at 25°–30° C. After recrystallization from isopropyl alcohol, it melts at 103°–104° C. Analysis gives 10.48% nitrogen and 24.48% sulfur compared to 10.60% nitrogen and 24.26% sulfur calculated for $C_{13}H_{16}N_2S_2$.

N-benzyl-2-benzothiazolesulfenamide in 92.0% yield as a white solid. It melts at 122°–123° C. after recrystallization from isopropyl alcohol. In this example after vacuum is released, 125 ml. of heptane is added to the molten product, and while stirring the product is heated to 85° C. for solution. The stirred solution is allowed to cool slowly to room temperature, cooled at 0°–10° C. for 30 minutes, filtered, and air-dried at 25°–30° C. Analysis gives 10.42% nitrogen and 23.70% sulfur compared to 10.29% nitrogen and 23.54% sulfur calculated for $C_{14}H_{12}N_2S_2$.

Further embodiments of the invention obtained by replacing N-tert-butyl - 2 - benzothiazolesulfenamide with another sulfenamide and reacting with an appropriate amine in the procedure of Example 1 are recorded below:

Replacing N-tert-butyl - 2 - benzothiazolesulfenamide with an equimolar amount of 98% N-isopropyl-2-benzothiazolesulfenamide, in the procedure of Example 1, yields 2-(morpholinothio)benzothiazole in 100% yield as a light tan solid. It melts at 86°–87° C. after recrystallization from heptane. Analysis gives 10.94% nitrogen and 25.64% sulfur compared to 11.10% nitrogen and 25.41% sulfur calculated for $C_{11}H_{12}N_2OS_2$.

Starting with 94.7% N-propyl - 2-benzothiazole sulfenamide in the above procedure, 2-(morpholinothio) benzothiazole is obtained in 100% yield as a light tan solid. It melts at 86°–87° C. after recrystallization from heptane. Analysis gives 11.03% nitrogen and 25.25% sulfur compared to 11.10% nitrogen and 25.41% sulfur calculated for $C_{11}H_{12}N_2OS_2$.

Replacing N-tert-butyl-2-benzothiazolesulfenamide with an equimolar amount of 96.4% N,N-diethyl-2-benzothiazolesulfenamide, in the procedure of Example 1, and air-drying the crude oily product at 25°–30° C. on a porous plate results in an 84% yield of 2-(morpholinothio)benzothiazole having an assay of 98.3%. The melting point is 86°–87° C. after recrystallization from heptane. Analysis gives 11.07% nitrogen and 25.50% sulfur compared to 11.10% nitrogen and 25.41% sulfur calculated.

In an identical preparation, after releasing the vacuum, 100 ml. of heptane is added and while stirring heated to 80° C. for solution. The stirred solution is cooled slowly to room temperature, cooled at 0°–10° C. for one hour, filtered, and air-dried at 25°–30° C. The yield is 91.4%. After recrystallization from heptane it melts at 86°–87° C. Analysis gives 10.97% nitrogen and 25.41% sulfur compared to calculated values of 11.10% nitrogen and 25.41% sulfur.

Replacing N-tert-butyl-2-benzothiazolesulfenamide with and equimolar amount of 98% N-isopropyl-2-benzothiazolesulfenamide and 25% excess of 2,6-dimethylmorpholine for the morpholine in Example 1, 2-(2,6-dimethylmorpholinothio)benzothiazole is obtained in 100% yield as a light tan solid. After recrystallization from heptane it melts at 102°–103° C. Analysis gives 10.19% nitrogen and 22.70% sulfur compared to 9.99% nitrogen and 22.85% sulfur calculated for $C_{13}H_{16}N_2OS_2$.

Example 2 and variations thereof illustrate the invention carried out in isopropyl alcohol as a solvent.

EXAMPLE 2

A stirred solution containing 49 grams (0.2 mole) of 98% N-tert-butyl-2-benzothiazolesulfenamide, 200 ml. of isopropyl alcohol, and 0.25 mole (25% excess) of 2,6-dimethylmorpholine is heated at 84°–86° C. for 1 hour and 45 minutes. During this heating period, 100 ml. of distillate is collected. Vacuum (10–20 mm.) is applied and held at 80°–90° C. for 15–20 minutes. The pressure is decreased to 5–10 mm. and the temperature held at 80°–90° C. for 25 minutes. The vacuum is then released and the stirred product is cooled to 25°–30° C. The 2-(2,6 - dimethyl - 4 - morpholinothio)benzothiazole is removed from the flask and air-dried at 25°–30° C. The yield is 100% of a light tan solid. It melts at 99°–100° C. after recrystallization from alcohol. Analysis gives 9.95% nitrogen and 22.96% sulfur compared to 9.99% nitrogen and 22.87% sulfur calculated for $C_{13}H_{16}N_2OS_2$.

Replacing 2,6-dimethylmorpholine with an equimolar amount of cyclohexylamine (25% excess) in the above procedure, N-cyclohexyl-2-benzothiazolesulfenamide is obtained in 100% yield. It is a white solid melting at 104°–105° C. after recrystallization from alcohol. Analysis gives 10.69% nitrogen and 24.43% sulfur compared to 10.60% nitrogen and 24.26% calculated for $C_{13}H_{16}N_2S_2$.

As pointed out above, not more than 25% excess of the amine is required. However, the following examples illustrate an embodiment of the invention employing a larger excess.

EXAMPLE 3

A stirred solution containing 49 grams (0.2 mole) of 98% N - tert - butyl - 2 - benzothiazolesulfenamide, 0.3 mole (50% excess) of morpholine, and 200 ml. of isopropyl alcohol is heated at 85° to 88° C. for 1½ hours. During this heating period, 100 ml. of distillate is collected. Vacuum (10–20 mm.) is applied and the stirred reaction is held at 80°–90 C. for 15 minutes. The pressure is reduced to 5–10 mm. (vacuum pump) and the temperature held at 80° to 90° C. for 15 minutes. The reaction is allowed to cool to room temperature and air-dried at 25°–30° C. 2-(morpholinothio)benzothiazole is obtained in 100% yield. After recrystallization from ethyl alcohol, it melts at 86°–87° C. Analysis gives 10.91% nitrogen and 25.45% sulfur compared to 11.10% nitrogen and 25.41% sulfur.

EXAMPLE 4

Into a suitable reactor fitted with a stirrer, condenser, and inlet tube is charged 476.8 grams of N-tert-butyl-2-benzothiazolesulfenamide and 191.7 grams of morpholine. The condenser is connected to a trap for collecting the effluent, and provision is made for reducing the pressure of the system. Through the inlet tube, nitrogen at the rate of 0.5 cu. ft. per hour is fed just below the surface of the reaction mixture. The reaction mixture is gently stirred and the pressure is reduced to 300 mm. of Hg while heat is applied to the reactor. Heating is continued until a temperature of 100° C. is reached over a period of about 35 minutes. The reaction mixture is then maintained at 100° C. for about one-half hour under 300 mm. pressure after which time the pressure is reduced to 20 mm. and the heating and gentle stirring continued for about 45 minutes at 100° C. The molten 2-(morpholinothio)benzothiazole is poured into heavy aluminum foil and allowed to crystallize. It weighs 501.4 grams, assay 98.7%, and contains only 0.36% of free amine and only a trace of material insoluble in ether.

It is intended to cover all changes and modifications of the examples of the invention herein chosen for purposes of disclosure which do not constitute departures from the spirit and scope of the invention. The matter contained in each of the claims is to be read as part of the general description of the present invention.

What is claimed is:

1. The method of preparing sulfenamides which comprises reacting chemicals consisting essentially of an N-substituted-2-thiazolesulfenamide wherein the thiazole radical is selected from the group consisting of thiazolyl, naphthothiazolyl, and benzothiazolyl optionally substituted by lower alkoxy, lower alkyl or halogen and the amid substituent is

wherein R is lower alkyl and $R_1$ is lower alkyl or hydrogen and an amine having at least one replacable hydrogen, which amine is selected from a group consisting of monoalkyl amines wherein alkyl is primary or secondary, dialkyl amines wherein alkyl is primary or secondary, morpholine, dimethylmorpholine, piperazine, heterocyclic amines of the formula

where A is alkylene of 4 to 8 carbon atoms, lower alkylene diamines, cyclohexylamine, benzyl amine, phenethyl amine, furfurylamine, tetrahydrofurfurylamine and ethanolamine and has a boiling point at least 20° C. higher than the amine by-product formed by addition of hydrogen to the N-substituted amide radical of the thiazolesulfenamide, and removing said by-product amine from the reaction zone.

2. The method of claim 1 wherein the amine reactant is within the range of 0.1 to 1.5 moles per mole of N-substituted-2-thiozolesulfenamide and wherein the amine reactant is weaker than the amine by-product.

3. The method of claim 1 where the N-substituted-2-thiazolesulfenamide is

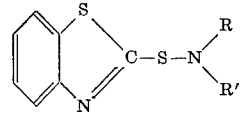

where R is lower alkyl and R' is lower alkyl or hydrogen.

4. The method of claim 3 where

is selected from a group consisting of tert-butylamino, isopropylamino, propylamino, and diethylamino, the amine reactant is selected from a group consisting of morpholine, dimethylmorpholine, pyrrolidine, 2,5-dimethylpyrrolidine, piperidine, hexamethylenimine, cyclohexylamine, and benzylamine, and the reactants are heated at a temperature within the range of 75°–120° C., at least part of the heating period being in vacuo.

5. The method of claim 4 where the molecular proportion of the amine reactant is sufficient to obtain substantially complete conversion of the starting sulfenamide.

6. The method of claim 5 where R is tert-butyl and R' is hydrogen.

7. The method of claim 5 where the amine reactant is a heterocyclic amine.

8. The method of claim 7 where the heterocyclic amine is morpholine.

9. The method of claim 8 where the reaction is conducted at 80°–100° C.

10. The method of claim 9 where the reaction is conducted neat, a stoichiometric excess of 10–25% morpholine is employed, and morpholine and by-product tert-butylamine are removed by heating in vacuo.

11. The method of claim 3 where R is lower alkyl and R' is hydrogen and the amine reactant is used in molecular proportion sufficient to obtain substantially complete conversion of the starting sulfenamide.

References Cited

UNITED STATES PATENTS 2,382,793   8/1945   Howland _____ 260—306.61

ALEX MAZEL, Primary Examiner

R. J. GALLAGHER, Assistant Examiner

U.S. Cl X.R.

260—247.1, 293.4